United States Patent [19]
Davis

[11] Patent Number: 5,926,550
[45] Date of Patent: Jul. 20, 1999

[54] PERIPHERAL DEVICE PREVENTING POST-SCAN MODIFICATION

[75] Inventor: Derek L. Davis, Phoenix, Ariz.

[73] Assignee: Intel Corporation, Santa Clara, Calif.

[21] Appl. No.: 08/829,594

[22] Filed: Mar. 31, 1997

[51] Int. Cl.⁶ .................................. H04L 9/00; H04L 9/30
[52] U.S. Cl. .................................. 380/25; 380/4; 380/23; 380/30; 380/49; 380/50; 380/51; 380/54; 380/55
[58] Field of Search ................................ 380/4, 9, 23, 25, 380/30, 49, 50, 51, 54, 55, 59

[56] References Cited

U.S. PATENT DOCUMENTS 5,291,243  3/1994  Heckman et al. .
5,530,755  6/1996  Pailles et al. ............................ 380/18
5,606,609  2/1997  Houser et al. ........................... 380/23
5,721,788  2/1998  Powell et al. ........................ 380/54 X
5,809,160  9/1998  Powell et al. ........................ 380/54 X

*Primary Examiner*—Bernarr E. Gregory
*Attorney, Agent, or Firm*—Blakely, Sokoloff, Taylor & Zafman

[57] ABSTRACT

A scanner constructed to prevent illicit post-scan modification of a data set. The data set is a representation of visual images printed on a document scanned by the scanner. To prevent illicit post-scan modification, the scanner produces a digital signature which is output in combination with the data set. This virtually ensures detection of any post-scan modification of the data set.

29 Claims, 5 Drawing Sheets

PERIPHERAL DEVICE PREVENTING POST-SCAN MODIFICATION

BACKGROUND OF THE INVENTION

1. Field of the Invention

The present invention relates to the field of data security. More particularly, the present invention relates to a peripheral device that (i) converts visible images into digital data, and (ii) digitally signs the data to prevent its unauthorized modification.

2. Description of Art Related to the Invention

For many years, our society has maintained a paper-based, communicative infrastructure that relies on documents. Herein, a "document" is broadly defined as one or more pieces of paper of any physical dimension with visible images placed thereon. These visual images include alphanumeric characters associated with any language as well as symbols or drawings.

Documents have been widely used for a variety of situations. For example, documents can be used as "receipts" in order to provide a consumer with a record of goods or services purchased by the consumer. Sometimes, receipts are required to obtain a refund or credit for a prior purchase, to receive a reimbursement for work-related expenses, to recover damages from insurance companies, to support a claimed tax deduction, and other reasons.

As our paper-based, social infrastructure slowly transitions into an electronic-based, social infrastructure, it is contemplated that a temporary hybrid system, which supports a mixture of paper and electronic medium, may be necessary. This is due to the fact that there are certain situations where documents need to be processed in paper form. For example, it is believed that expense reports need to be filed with original signatures in order to obtain tax relief. As digital signatures become recognized as an acceptable alternative to handwritten signatures, electronic transmission of expense reports may become an acceptable practice.

Unfortunately, in the case of expense reports, other documents are usually required to accompany the expense report. These documents may include receipts for meals, lodging and transportation which are provided in a paper form. While we can expect that many receipts may migrate to an electronic format over the long term, some receipts may remain in paper form for an indefinite period of time. Thus, even if the expense report could be filed electronically, electronic-only handling of the entire expense report currently is not possible.

One possible solution to this problem is to digitally scan the receipts using a dedicated scanner to produce a data set, and to temporarily store the data set within a computer. Thereafter, the data set is transmitted with the electronic expense report. However, this creates an opportunity for illicit post-scan modification of the data set. Illicit post-scan modification would expose businesses to the danger of exaggerated reimbursement requests, and would also expose local, state and/or federal legislatures to claims of exaggerated tax deductions by businesses.

Thus, it would also be advantageous to create a system and method which discourages illicit post-scan modifications by providing a reliable mechanism to easily detect such modification.

SUMMARY OF THE INVENTION

The present invention is related to a system and method for preventing unauthorized modification of a data set after being output from a peripheral device. After digitizing visual images of a document, a digital signature based on the data set is produced within the peripheral device. In one embodiment, this digital signature is output along with the data set to provide a mechanism, used to check at its destination, whether the data set has experienced post-scan modification.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention generally relates to a peripheral device that discourages unauthorized modification of the content of a data set. More specifically, the peripheral device involves a scanner which produces a digital representation that is difficult to illicitly modify without subsequent detection of such modification. While the description focuses on a scanner, other alternative embodiments of the peripheral device are contemplated such as a facsimile machine.

Herein, certain details are set forth in order to provide a thorough understanding of the present invention. Without deviating from its spirit and scope, the present invention may be practiced through many different embodiments, other than those embodiments illustrated. In addition, well-known circuits, elements and the like may not set forth in detail in order to avoid unnecessarily obscuring the present invention.

In the detailed description, a number of terms are frequently used to describe certain characteristics or qualities which are defined herein. A "key" is an encoding and/or decoding parameter used by symmetric key cryptographic functions such as Data Encryption Standard (DES) or public-key cryptographic functions such as Rivest Shamir Adleman (RSA). A "data set" is defined as digitized data corresponding to a scanned document. A "digital certificate" is defined as digital information (e.g., a public key) cryptographically bound by a private key by a widely known "trusted" authority. A trusted authority may include, but is not limited or restricted to a bank, governmental entity, trade association, original equipment manufacturer, security department, or any person or entity in a position of trust to guarantee or sponsor the digital certificate. A "digital signature" involves application of a cryptographic signing function (e.g., Digital Signaturing Algorithm "DSA") to a data set (or its corresponding hash value) in order to ensure its integrity.

Figure 1:
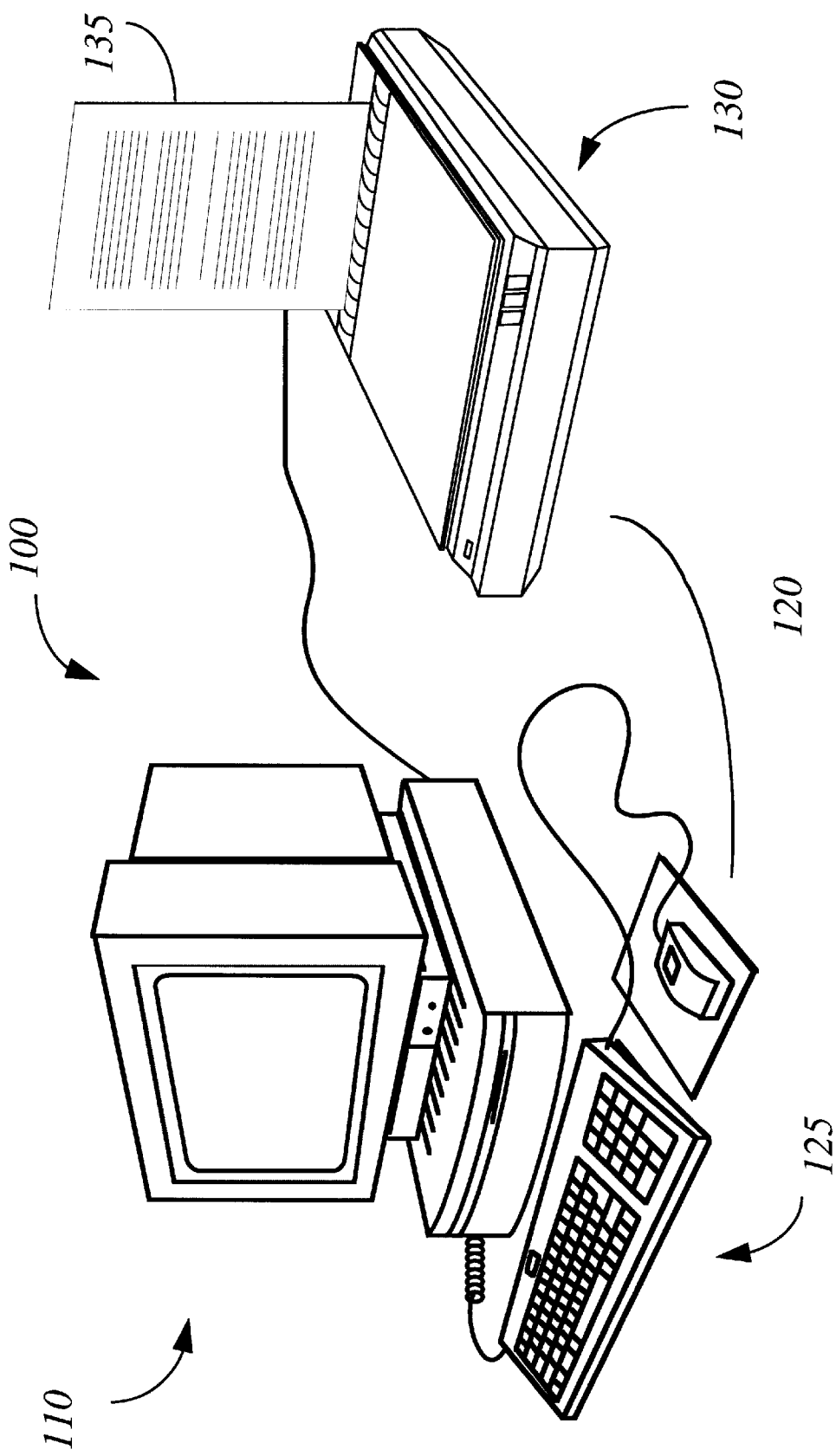
FIG. 1 is a first embodiment of an electronic system including a dedicated scanner capable of digitally signing a data set.

Referring to FIG. 1, a perspective view of a first embodiment of the electronic system 100 utilizing the present invention is shown. The electronic system 100 features a computer 110 interconnected to a number of peripheral devices 120. Computer 110 may be interconnected to a network such as a dedicated local area network (LAN) or a wide area network (WAN) such as the Internet. This allows computer 110 to electronically communicate with other computers in order to upload or download data sets.

As shown, the peripheral devices 120 may include a data input source (e.g., a keyboard, a numeric pad, a cursor control device, etc.) 125 and an optical scanner 130. Normally, coupled to a port located on the backside of computer 110 (e.g., a serial, parallel, Universal Serial Bus port, etc.), scanner 130 may be a desktop scanner constructed as a flatbed scanner, or as shown, a scanner having an automatic feed mechanism (e.g., a rotated roller) to assist in scanning of a document 135. As an alternative embodiment (not shown), scanner 130 may be constructed as a hand-held scanner. Unlike the desktop scanner, the hand-held scanner requires active participation by the user to adjust the scanner or document in order to produce a data set for the document.

Figure 2:
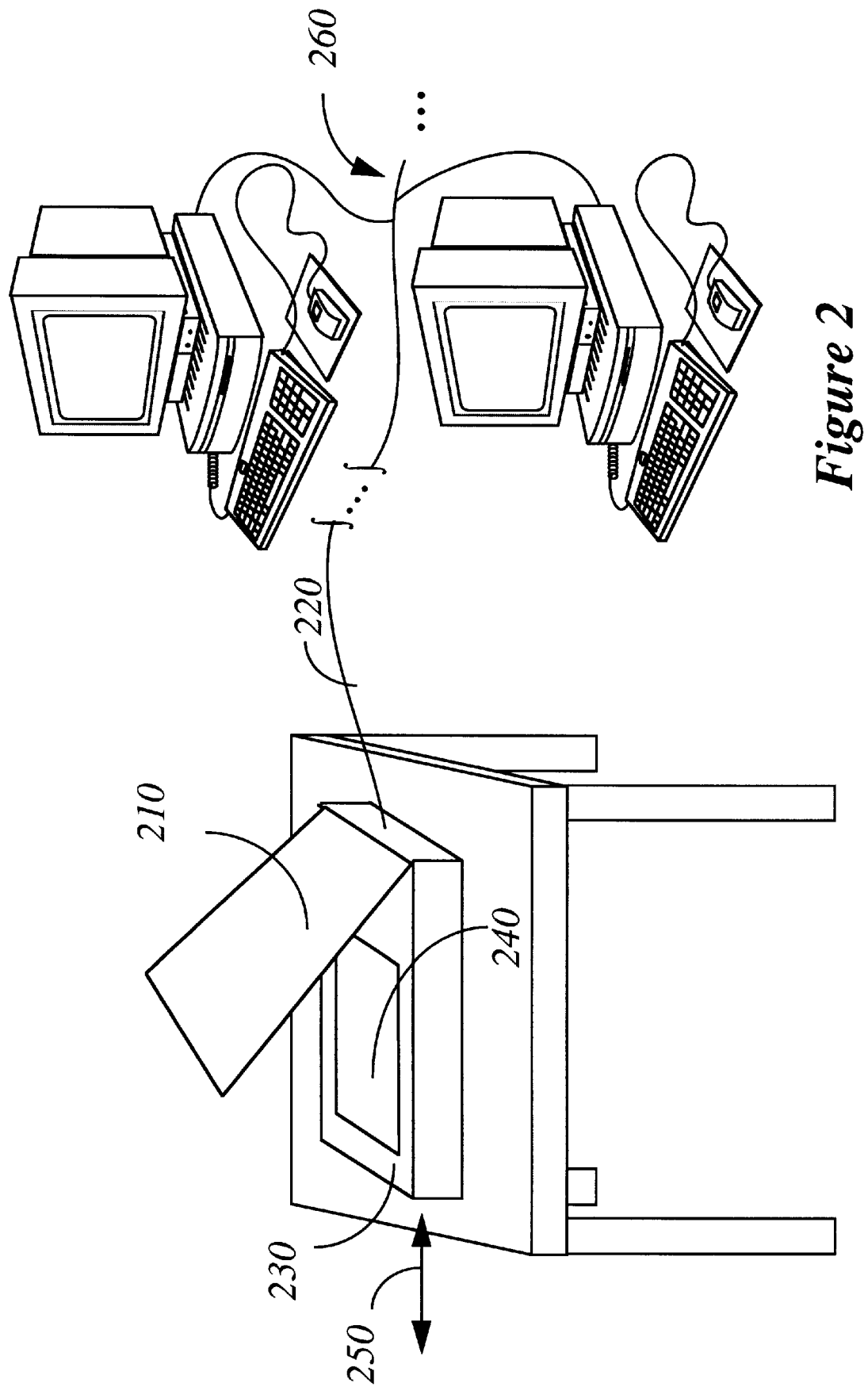
FIG. 2 is a second embodiment of an electronic system including a shared-resource scanner coupled to a network, the scanner producing a digital signature based on the data set before its transmission to a destination.

Referring now to FIG. 2, a perspective view of a second embodiment of the electronic system 200 utilizing the present invention is shown. Electronic system 200 is a shared-resource scanner 210 coupled to a network (e.g., a local area network "LAN" or a wide area network "WAN") 220. For illustrative purposes, shared-resource scanner 210 is shown as a flatbed scanner including a scanning platform 230 upon which a document 240 is laid face-down with its visible image(s) facing the scanning platform 230. Document 240 is scanned by moving scanning platform 230 along a generally horizontal direction as indicated by arrow 250 or by moving the scanning device along that generally horizontal direction. The resulting data set, a digital representation of the document, is routed to a targeted destination 260 through network 220. It is contemplated that shared-resource scanner 210 may include any other type of scanner construction.

Figure 3:
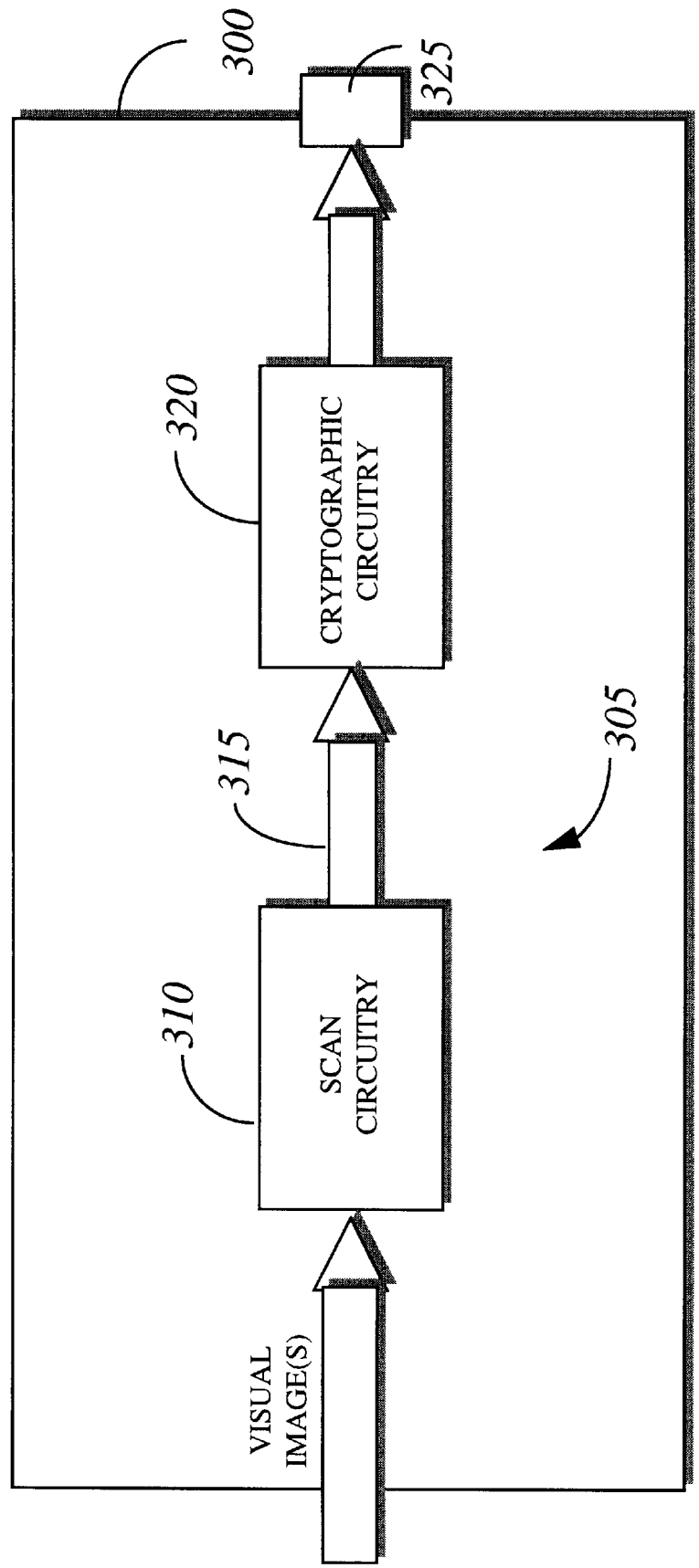
FIG. 3 is an embodiment of the scanner employing cryptographic circuitry capable of producing the digital signature.

Referring now to FIG. 3, both dedicated scanners and shared-resource scanners comprise a casing 300. The casing 300 protects internal circuitry 305 from harmful contaminants and environmental conditions. Internal circuitry 305 includes scan circuitry 310 and cryptographic circuitry 320. Well-known in the art, the scan circuitry 310 converts visual image(s) placed on a document into a data set 315 featuring digital representations of the visual image(s). Normally, these digital representations possess certain characteristics (e.g., size, resolution, contrast, etc.) substantially similar to the visual image(s). Unlike conventional scanners which subsequently route digitized data to a computer or a storage device, within the present invention, data set 315 is routed to cryptographic circuitry 320 within casing 300.

Figure 4:
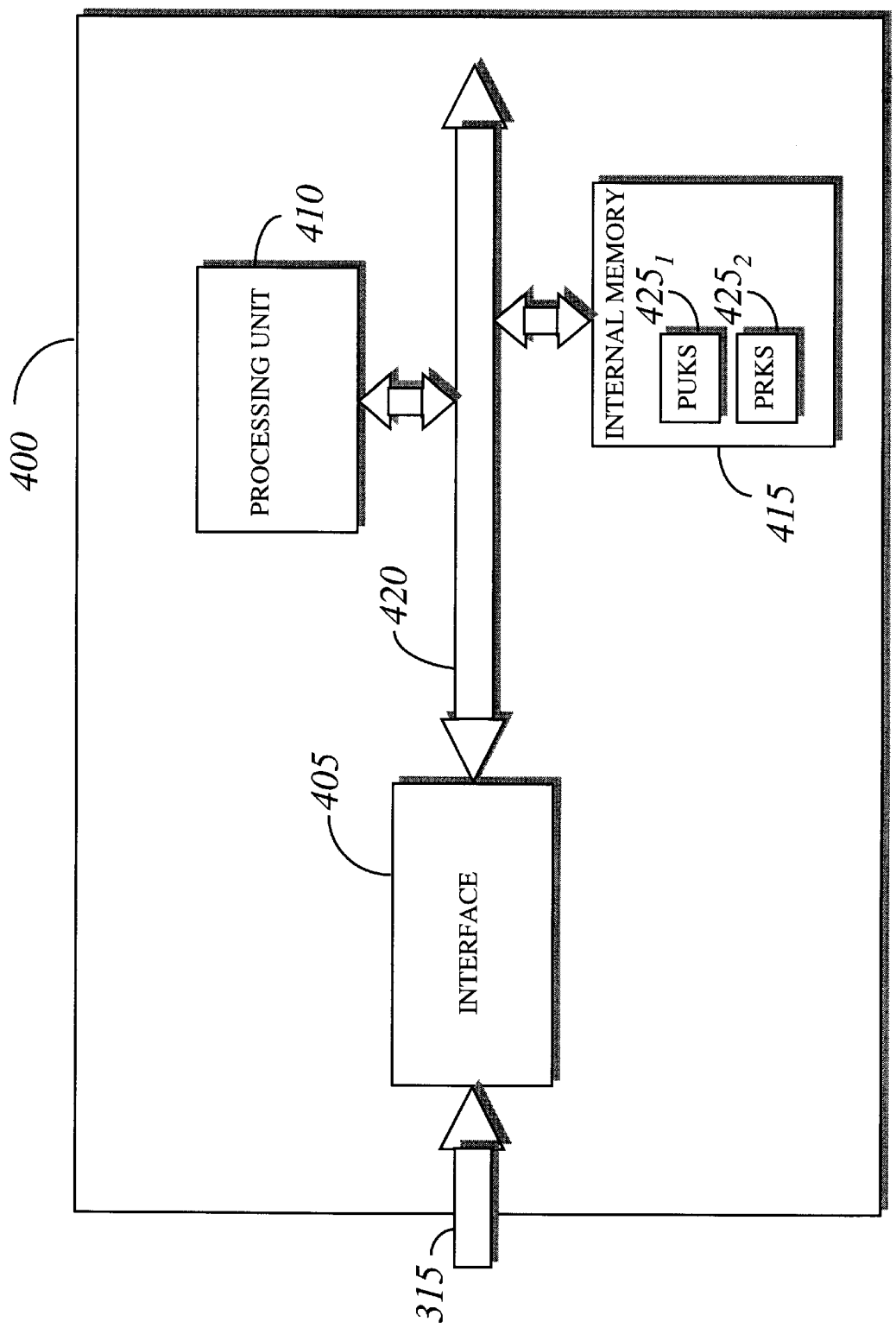
FIG. 4 is an embodiment of a cryptographic processor being at least a portion of the cryptographic circuitry of FIG. 3.

The cryptographic circuitry 320 performs cryptographic operations, such as producing a digital signature from the input data set 315, and outputs at least the digital signature and data set through an output port 325. One embodiment of this cryptographic circuitry 320 includes a cryptographic processor 400 implemented with an interface 405, a processing unit 410 and an internal memory 415 as shown in FIG. 4. Interface 405 receives data set 315 (of FIG. 3) and appropriately places the data onto an internal bus 420, which is coupled to interface 405, processing unit 410 and internal memory 415. Processing unit 400 is configured to access stored information from internal memory 415 in order to process data set 315 and produce a digital signature. The digital signature, and typically the data set, would be output from interface 405, or possibly another interface (not shown), to external circuitry responsible for transmission to a targeted destination. This destination may include a dedicated computer storage device or any device connected to a network.

Internal memory 415 contains a key pair, namely a public key (PUKS) $425_1$ and a private key (PRKS) $425_2$. The private key (PRKS) is used to produce digital signatures. The public and private keys $425_1$ and $425_2$ may be unique to each particular scanner, or may be universally implemented into all scanners if this lesser type of protection is acceptable. Internal memory 415 may further contain (i) one or more shared keys to support symmetric key cryptography, and/or (ii) one or more digital certificates. Examples of a digital certificate that may be contained within internal memory 415 include at least a public key associated with the scanner (PUKS) encrypted with a private key of a trusted authority (PRKTA) whose public key (PUKTA) is pre-loaded or well-known and widely available.

It is contemplated, however, that there are other embodiments for cryptographic circuitry 320. One embodiment may include cryptographic processor 400 connected to memory, external to processor 400 but still within the casing 300 via one or more communication lines, in lieu of implementing internal memory 415 within cryptographic processor 400 as shown. Preferably, but not necessary, the communication lines would be "secure," with communications over the communication lines encrypted or protected through any other cryptographic operation.

Another embodiment of cryptographic circuitry 320 includes logic circuitry, other than a processor, to produce the digital signature. Such logic circuitry may include, but is not limited or restricted to, a state machine configured to digitally sign input information, a micro-controller executing a cryptographic signing function, or any other hardware and software responsible for digitally signing a data set to create a digital signature.

Figure 5:
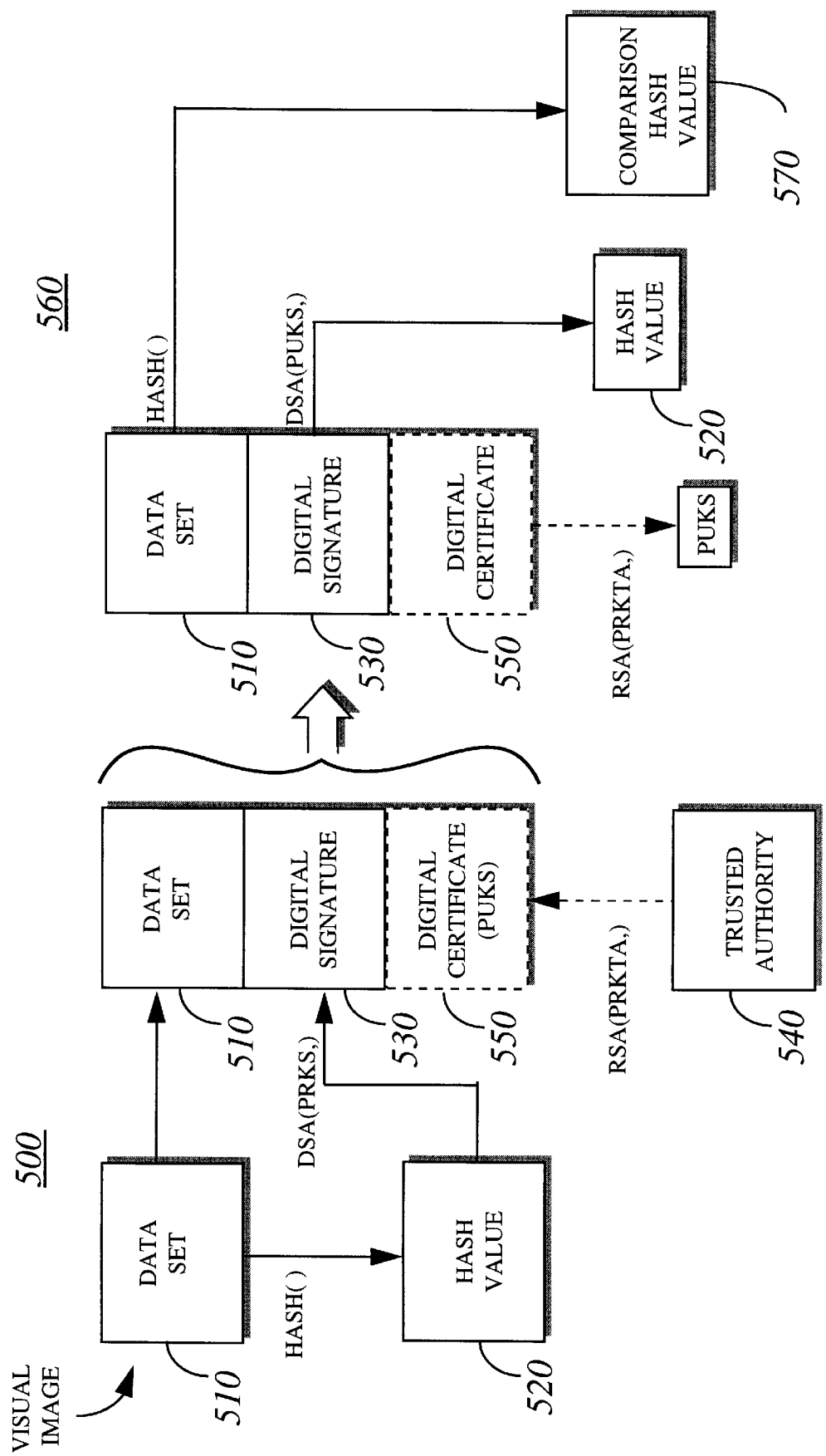
FIG. 5 is an illustrative block diagram of the operations performed by the scanner to prevent post-scan modification.

Referring now to FIG. 5, a block diagram featuring the internal operations of the peripheral device (e.g., optical scanner) of FIGS. 1–2 is shown. These internal operations are performed independent of its selected hardware implementation. Upon positioning the document on a scanning table or in a roller mechanism and placing the scanner into an operational state, each visual image is converted by scan circuitry into a corresponding digital representation of the image. Collectively, these digital representations form a data set 510. As shown, data set 510 undergoes a one-way hash function to produce a hash value 520 of a fixed bit length, normally smaller in size than data set 510.

Hash value 520 is digitally signed with the private key of the scanner (PRKS) to produce a digital signature 530. The private key (PRKS) may be unique to this scanner or commonly shared by a number of scanners. After digital signature 530 is produced within scanner 500, at least the digital signature 530 and the data set 510 are transmitted to a targeted destination 560 (e.g., a computer) for storage or use. Data set 510 may be transmitted in a non-encrypted format (as shown) or may be encrypted before transmission to its destination. Likewise, as represented by dotted lines, a digital certificate 550, including the public key (PUKS) of the scanner signed with a private key (PRKTA) of a remotely located trusted authority 540 using a public-key cryptographic function (e.g., RSA or DSA), may accompany the data set 510 and digital signature 530. Digital certificate 550 would be necessary if the public key (PUKS) of the scanner 500 is not widely available or was not somehow accessible (e.g., already pre-loaded) by targeted destination 560.

Upon receiving the digital bit stream from the scanner, if the digital certificate 550 is provided, targeted destination 560 initially decrypts digital certificate 550 using the public key of the trusted authority (PUKTA). The public key of the trusted authority (PUKTA) is available by previously storing PUKTA within targeted destination 560 or by loading PUKTA as needed. Such decryption allows targeted destination 560 to obtain access to the public key (PUKS) of scanner 500.

Once the targeted destination 560 has access to the public key of the scanner, either from decrypting digital certificate 550 or retrieving the previously loaded public key from memory within targeted destination 560, it decrypts digital signature 530 to obtain hash value 520. Prior, concurrent or subsequent to this operation, data set 510 undergoes a hashing operation utilizing the same hash function as used in the scanner 500. This hashing operation produces a comparison hash value 570. The comparison hash value 570 is compared to hash value 520. If these hash values 520 and 570 are identical, no modification of the data has been performed. However, if these hash values 520 and 570 differ, illicit post-scan modification of the data set has been performed or corruption occurred.

Alternatively, it is contemplated that a hash function may not be used to produce the digital signature 530. Instead, the data set 510 in its entirety is digitally signed. Thus, validation is conducted through comparison of the transmitted data set with the data set retrieved from digital signature 530.

Of course, the invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for preventing unauthorized modification of a data set after being output from a peripheral device, the method comprising:
   producing a digital signature based on the data set within the peripheral device, the production of the digital signature includes
   receiving the data set as input for a hash function,
   converting the data set into a hash value by executing the hash function, and
   digitally signing the hash value with a private key associated with the peripheral device; and
   outputting at least the digital signature from the peripheral device.

2. The method of claim 1, wherein prior to producing the digital signature, the method comprises converting a plurality of visual images on a document into the data set.

3. The method of claim 2, wherein prior to the outputting of at least the digital signature, the method further comprises producing a digital certificate, the digital certificate including a public key associated with the peripheral device encrypted to a private key of a trusted authority.

4. The method of claim 3, wherein the outputting of at least the digital signature includes outputting the data set, the digital signature and the digital certificate.

5. The method of claim 3, wherein the outputting of at least the digital signature includes outputting the digital certificate and the digital signature.

6. The method of claim 1, wherein the peripheral device is a scanner.

7. The method of claim 6, wherein the producing of the digital signature includes digitally signing the data set with a private key associated with the scanner.

8. The method of claim 6, wherein the outputting of at least the digital signature includes providing both the data set and the digital signature as output.

9. A scanner comprising:
   scan circuitry to convert a plurality of visual images of a document into a data set including digital information; and
   cryptographic circuitry coupled to the scan circuitry, the cryptographic circuitry to produce a digital signature associated with the data set before the data set and the digital signature are output from the scanner, the cryptographic circuitry includes a processing unit and internal memory to contain at least a private key associated with the scanner and at least one cryptographic program for execution by the processing unit to perform at least one cryptographic operation.

10. The scanner of claim 9, wherein the cryptographic circuitry includes a cryptographic processor.

11. The scanner of claim 9, wherein the cryptographic circuitry further includes
   an internal bus coupled to the processing unit; and
   an interface coupled to the internal bus, the interface to receive the data set and to place the data set onto the internal bus.

12. The scanner of claim 11, wherein the cryptographic processor further includes internal memory to contain information needed for the processing unit to perform the at least one cryptographic operation.

13. The scanner of claim 11, further comprising an external memory element containing information needed by the processing unit to perform the at least one cryptographic operation.

14. A method comprising:
   digitizing visual images placed on a printed document by a scanner to create a data set;
   converting the data set into a hash value;
   digitally signing the hash value with a private key associated with the scanner to produce a digital signature; and
   outputting at least the data set and the digital signature from the scanner.

15. The method of claim 14, wherein prior to the outputting of at least the data set and the digital signature, the method further comprising receiving a digit al certificate.

16. The method of claim 15, wherein the digital certificate includes a public key associated with the scanner digitally signed with a private key of a trusted authority.

17. The method of claim 15, wherein the outputting of at least the data set and the digital signature includes outputting of the digital certificate.

18. The method of claim 14, wherein the converting of the data set includes performing a hash function on the data set to produce the hash value, the hash value being of a fixed bit size smaller than the data set.

19. A method for preventing unauthorized modification of a data set after being output from a peripheral device, the method comprising:
   converting a plurality of visual images on a document into the data set; producing a digital signature based on the data set within the peripheral device;
   producing a digital certificate, the digital certificate including a public key associated with the peripheral device encrypted with a private key of a trusted authority; and outputting at least the digital signature from the peripheral device.

20. The method of claim 19, wherein the peripheral device includes a scanner.

21. The method of claim 20, wherein the producing of the digital signature includes digitally signing the data set with a private key associated with the scanner.

22. The method of claim 19, wherein the outputting of at least the digital signature includes outputting the data set, the digital signature and the digital certificate.

23. The method of claim 19, wherein the outputting of at least the digital signature includes providing the digital certificate and the digital signature.

24. A method for preventing unauthorized modification of a data set after being output for a scanner, comprising:

producing a digital signature within the scanner by digitally signing the data set with a private key associated with the scanner; and outputting at least the digital signature from the scanner.

25. The method of claim 24, wherein the producing of the digital signature further comprises receiving the data set as input for a hash function;

converting the data set into a hash value by executing the hash function; and digitally signing the hash value with the private key.

26. The method of claim 24, wherein prior to producing the digital signature, the method comprises converting a plurality of visual images on a document into the data set.

27. The method of claim 26, wherein prior to the outputting of at least the digital signature, the method further comprises producing a digital certificate, the digital certificate including a public key associated with the peripheral device encrypted to a private key of a trusted authority.

28. The method of claim 27, wherein the outputting of at least the digital signature includes outputting the data set, the digital signature and the digital certificate.

29. The method of claim 27, wherein the outputting of at least the digital signature includes outputting the digital certificate and the digital signature.

* * * * *

UNITED STATES PATENT AND TRADEMARK OFFICE
CERTIFICATE OF CORRECTION

PATENT NO.    : 5,926,550
DATED         : July 20, 1999
INVENTOR(S)   : Davis

It is certified that error appears in the above-identified patent and that said Letters Patent is hereby corrected as shown below:

Column 1,
Line 36, delete "become" and insert -- because --.

Column 6,
Line 49, delete "digit al" and insert -- digital --.

Signed and Sealed this

Twenty-fifth Day of March, 2003

JAMES E. ROGAN
*Director of the United States Patent and Trademark Office*